United States Patent
Glick et al.

(10) Patent No.: US 7,917,952 B1
(45) Date of Patent: Mar. 29, 2011

(54) REPLACE MALICIOUS DRIVER AT BOOT TIME

(75) Inventors: Adam Glick, Culver City, CA (US);
David Kane, Los Angeles, CA (US);
Yung-Shuo Lin, Torrance, CA (US)

(73) Assignee: Symantec Corporation, Mountain View, CA (US)

( * ) Notice: Subject to any disclaimer, the term of this patent is extended or adjusted under 35 U.S.C. 154(b) by 798 days.

(21) Appl. No.: 11/873,583

(22) Filed: Oct. 17, 2007

(51) Int. Cl.
*G06F 11/00* (2006.01)
*G06F 12/14* (2006.01)
*G06F 12/16* (2006.01)
*G08B 23/00* (2006.01)
*G06F 11/30* (2006.01)

(52) U.S. Cl. .............. 726/22; 713/188; 726/23; 726/24; 726/25

(58) Field of Classification Search .................. None
See application file for complete search history.

(56) References Cited

U.S. PATENT DOCUMENTS

| | | | | |
|---|---|---|---|---|
| 2007/0022287 A1* | 1/2007 | Beck et al. | ..................... | 713/164 |
| 2007/0113062 A1* | 5/2007 | Osburn et al. | ..................... | 713/1 |
| 2007/0118646 A1* | 5/2007 | Gassoway | ..................... | 709/225 |
| 2008/0005797 A1* | 1/2008 | Field et al. | ..................... | 726/24 |
| 2008/0282350 A1* | 11/2008 | Khilnani et al. | ................ | 726/24 |
| 2009/0013409 A1* | 1/2009 | Wenzinger et al. | ............. | 726/24 |
| 2009/0119778 A1* | 5/2009 | Bhuyan | ........................... | 726/25 |

OTHER PUBLICATIONS

Kennedy, M., et al., U.S. Appl. No. 11/400,538, filed Apr. 6, 2006, entitled "Utilizing Early Exclusive Volume Access and Direct Volume Manipulation to Remove Protected Files" (21 pages, 3 shts).
Naftel, T., et al., U.S. Appl. No. 11/694,711, filed Mar. 30, 2007, entitled "Remediating Malware Infections Through Obfuscation" (19 pages, 3 shts).

* cited by examiner

*Primary Examiner* — Shin-Hon Chen
(74) *Attorney, Agent, or Firm* — Gunnison, McKay & Hodgson, L.L.P.; Philip McKay

(57) ABSTRACT

A malicious driver replacement application is installed on a host computer system and registered as a boot execute application. On notification of a malicious driver detection, the malicious driver replacement application reboots the host computer system and locks the volume of a storage disk containing the malicious driver. The malicious driver is replaced directly on the storage disk with a dummy driver having innocuous code. The malicious driver replacement application reboots the host computer system, and on reboot of the host computer system, the dummy driver is loaded rather than the malicious driver thus preventing the malicious driver from interfering with the standard operating system routines and allowing the malicious driver to be remediated.

20 Claims, 3 Drawing Sheets

REPLACE MALICIOUS DRIVER AT BOOT TIME

BACKGROUND OF THE INVENTION

1. Field of the Invention

The present invention relates to the protection of computer systems. More particularly, the present invention relates to replacement of malicious drivers on a computer system.

2. Description of Related Art

Malicious code, such as malicious rootkits, are often difficult to detect and remediate on a computer system. For example, some malicious rootkits hide their files and processes, erase their activity, and alter information returned to a user or a computer system to conceal the presence of the rootkit on the computer system. Frequently, even when detected, a malicious rootkit is often difficult to remediate as the malicious rootkit may interfere with the standard routines of an operating system.

SUMMARY OF THE INVENTION

According to one embodiment of the invention, a method for replacing a malicious driver on a host computer system includes: receiving a malicious driver detection, the malicious driver detection identifying a location of a malicious driver on a host computer system; issuing a first reboot signal, the first reboot signal causing the host computer system to perform a first reboot; receiving a first start up signal; locking a volume of a storage disk on which the malicious driver is located; replacing the malicious driver on the storage disk with a dummy driver; issuing a second reboot signal, the second reboot signal causing the host computer system to perform a second reboot; receiving a second start up signal; and, taking protective actions, such as remediating the malicious driver.

Embodiments in accordance with the present invention are best understood by reference to the following detailed description when read in conjunction with the accompanying drawings.

BRIEF DESCRIPTION OF THE DRAWINGS

Common reference numerals are used throughout the drawings and detailed description to indicate like elements.

DETAILED DESCRIPTION

Malicious code is frequently installed on computer systems as malicious rootkit drivers so that on boot up of the computer system, the malicious rootkit driver is loaded and can modify the standard operations of an operating system. Consequently, the malicious rootkit driver can conceal its presence and initiate malicious activity.

Embodiments in accordance with the invention, replace the malicious code of a malicious driver directly on the storage disk, i.e., the hard disk of the computer system, with dummy code of a dummy driver. On reboot of the computer system, the dummy driver is loaded rather than the malicious driver thus preventing the malicious driver from interfering with the standard operating system routines and allowing the malicious driver to be remediated.

Figure 2:
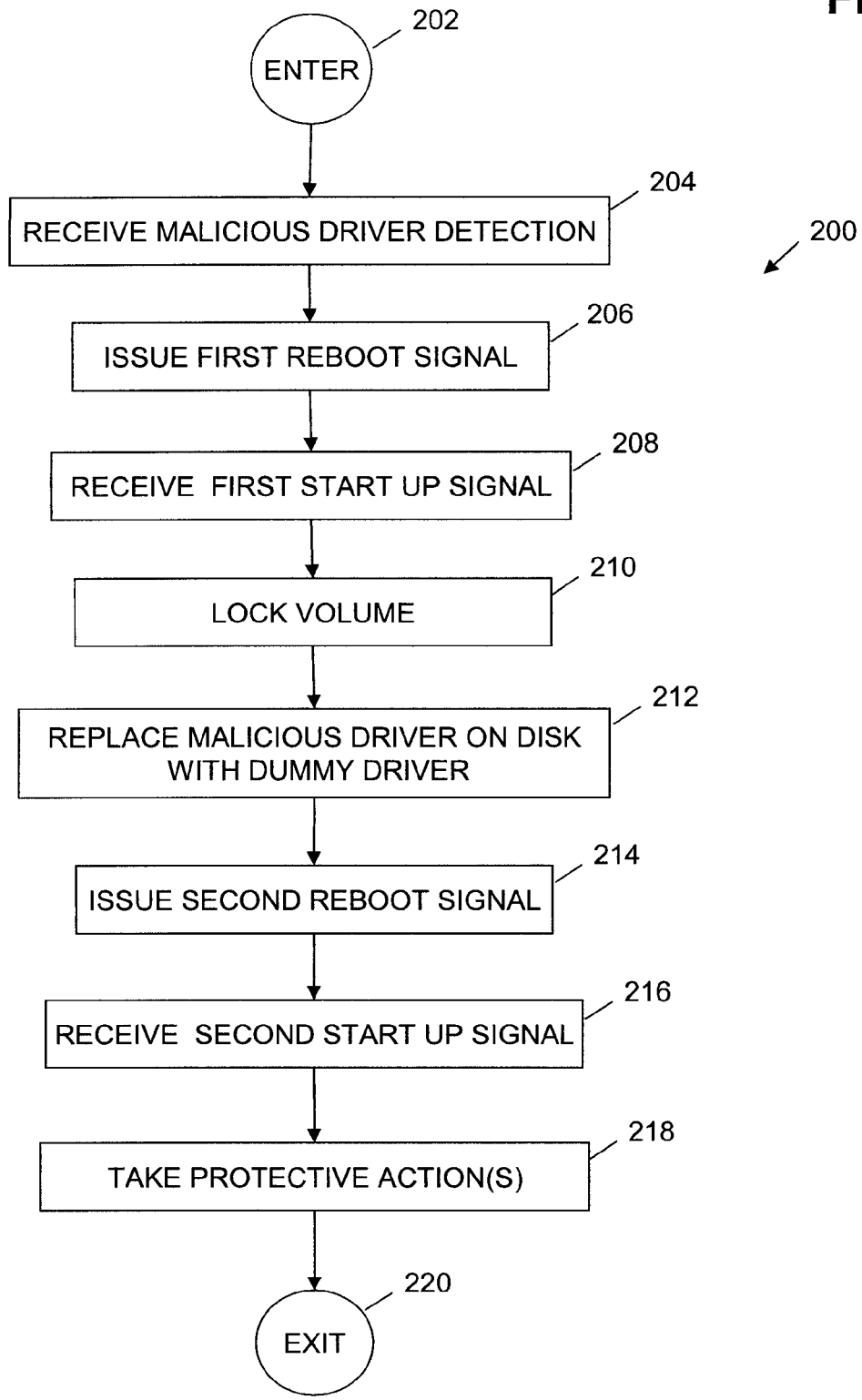
FIG. 2 illustrates a flow diagram of a method for replacing a malicious driver at boot time in accordance with one embodiment of the invention.

Referring generally to FIG. 2, in one embodiment, a malicious driver replacement application registered as a boot execute application on a host computer system receives a malicious driver detection identifying a location of a malicious driver on the host computer system (operation 204). A first reboot signal is issued (operation 206) causing the host computer system to perform a first reboot of the host computer system. During reboot of the host computer system, registered boot execute applications are started with malicious driver replacement application receiving a first start up signal (operation 208). A volume of a storage disk in which the malicious driver is located is locked (operation 210), and the malicious driver is directly replaced on storage disk with a dummy driver (operation 212). A second reboot is issued (operation 214) causing the host computer system to perform a second reboot. During the second reboot of the host computer system, registered boot execute applications are started with malicious driver replacement application receiving a second start up signal (operation 216). Further, on the second reboot, the dummy driver is loaded rather than the malicious driver, and protective actions are taken (operation 218) to remediate the malicious driver, for example, by removing the malicious driver from the host computer system.

The following embodiments in accordance with the invention are described with reference to a Windows operating system, such as Windows 2000/XP/NT, however, those of skill in the art can recognize that, in other embodiments, the present invention is applicable to other operating systems as well. Herein, in one embodiment, malicious code is defined as any computer program, module, set of modules, or code that enters a computer system environment without an authorized user's knowledge and/or without an authorized user's consent. A malicious rootkit driver is one example of malicious code.

Figure 1:
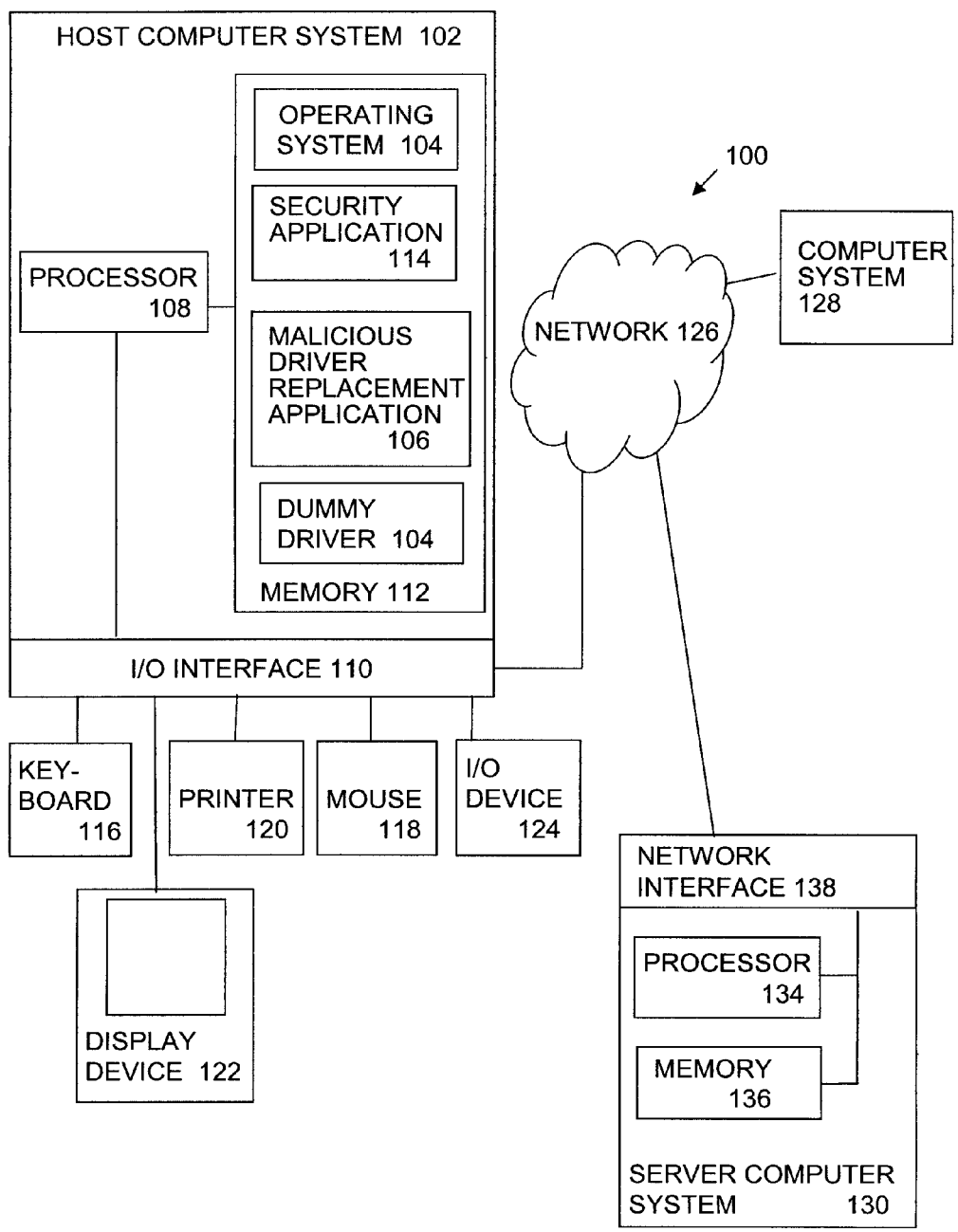
FIG. 1 is a diagram of a computer system including a malicious driver replacement application executing on a host computer system in accordance with one embodiment of the invention.

Referring now to FIG. 1, FIG. 1 is a diagram of a computer system 100 including a malicious driver replacement application 106 executing on a host computer system 102, e.g., a first computer system, in accordance with one embodiment of the present invention. Host computer system 102, sometimes called a client or user device, typically includes a central processing unit (CPU) 108, hereinafter processor 108, an input/output (I/O) interface 110, a memory 112, and an operating system 104.

In one embodiment, malicious driver replacement application 106 is stored in memory 112 of host computer system 102 and executed on host computer system 102. In one embodiment, malicious driver replacement application 106 is a native mode application. In one embodiment, memory 112 of host computer system 102 further includes a security application 114 which detects malicious drivers present on host computer system 102 and generates malicious driver notifications receivable by malicious driver replacement application 106. In one embodiment, a malicious driver notification includes the name of the malicious driver and the location of the malicious driver on host computer system 102. In one embodiment, the location of the malicious driver includes a volume identifier, identifying the volume of the storage disk in which the malicious driver is located.

In some embodiments, security application 114 can also take actions to remediate malicious drivers on host computer system 102, such as in response to a remediation request generated by malicious driver replacement application 106. In some embodiments, security application 114 is a security engine application, such as an antivirus engine, in which malicious driver replacement application 106 is included and/or with which malicious driver replacement application 106 is communicatively coupled.

In one embodiment, memory 112 includes a storage disk (not shown) for permanent storage of files, sometimes called non-volatile memory, non-temporary storage memory, non-temporary storage media, or permanent storage memory. For example, in one embodiment, the storage disk is a hard drive, e.g., a magnetic hard drive, a floppy disk, a CD-ROM, and/or a DVD. Generally, files stored in permanent storage memory, e.g., a magnetic hard disk, a floppy disk, a CD-ROM, a DVD, are unaffected and maintained, i.e., are not lost, upon powering down (turning off) of host computer system 102. Stated another way, the permanent storage memory stores files absent voltage to the permanent storage memory.

In various embodiments, memory 112 further includes volatile memory for non-permanent storage of files, sometimes called temporary storage memory, non-temporary storage media, or non-permanent storage memory. Generally, files stored in non-permanent storage memory, are lost upon powering down (turning off) of host computer system 102.

In one embodiment, operating system 104 is a page-based virtual memory system that uses pages, e.g., memory areas. For example, Windows 2000/XP/NT are operating systems widely used on home and business computer systems. Windows 2000/XP/NT provide page-based virtual memory management schemes that permit programs to realize a virtual memory address space.

In one embodiment, when processor 108 is running in virtual memory mode, all addresses are presumed virtual addresses and are translated, or mapped, to physical addresses on the storage disk each time processor 108 executes a new instruction to access memory. Thus, a physical address of a file on the storage disk can be accessed by operating system 104 and data input to the storage disk, e.g., a write operation, or output from the storage disk, e.g., a read operation.

Conventionally, the virtual memory address space is divided into two parts: a lower user address space, also referred to as user mode address space, or ring 3, available for use by a program; and, a higher system address space, also referred to as kernel address space, or ring 0, reserved for use by the operating system.

The storage disk is typically divided into sectors that are addressable blocks of a fixed size, for example, 512 bytes. Windows operating systems divide a disk into areas known as partitions and use file systems to format each partition as one or more volumes. Typically, a storage disk can have up to four primary partitions; however, primary partitions can be further divided into additional partitions resulting in a number of partitions and volumes on a storage disk.

As described above, data is stored in a volume of a storage disk in accordance with a file system. A file system defines a format for the storage of data on the storage disk, and more particularly, in a volume of a storage disk. Windows operating systems typically support several file systems such as the NTFS (native file system); the CDFS (CD-ROM file system); and, the FAT (file allocation table file system).

Windows operating systems store data in fixed length blocks of bytes called clusters. Clusters are addressable blocks defined during a high level formatting of a storage disk performed by the operating system. Clusters are typically a multiple of a sector size. The file system references, i.e., maps, the sectors of a storage disk to clusters utilized by the file system. Typically a file system driver implements a file system. The file system driver maintains a table, or other data structure, that includes settings that indicate the various states of the clusters on the storage disk.

Host computer system 102 conventionally utilizes a boot routine, sometimes termed a start-up routine, which initiates the start of applications on host computer system 102. Applications which are loaded during the boot routine, herein termed boot execute applications, are registered on host computer system 102 in a registry, such as for example, in the Windows registry at the key HKEY_LOCAL_MACHINE\SYSTEM\ CurrentControlSet\Control\Session Manager in the BootExecute value of host computer system 102.

Typically a boot of host computer system 102 can be implemented as a hard boot, also termed a hard reset, in which power is turned off to host computer system 102 and then restored, or as a soft boot, also termed a soft reset, in which power is not turned off. Boot routines, boot registries, boot execute applications, hard boot, and soft boot are terms well known to those of skill in the art, and are not further described in detail herein to avoid detracting from the principles of the invention.

Host computer system 102 may further include standard devices like a keyboard 116, a mouse 118, a printer 120, and a display device 122, as well as, one or more standard input/output (I/O) devices 124, such as a compact disk (CD) or DVD drive, floppy disk drive, or other digital or waveform port for inputting data to and outputting data from host computer system 102. In one embodiment, malicious driver replacement application 106 is loaded onto host computer system 102 via IO device 124, such as from a CD, DVD or floppy disk containing malicious driver replacement application 106.

In one embodiment, host computer system 102 is coupled to a server computer system 130 of system 100 by a network 126. Server computer system 130 typically includes a processor 134, a memory 136, and a network interface 138.

Host computer system 102 can also be coupled to a computer system 128, such as an attacker computer system, of system 100 by network 126. In one embodiment, computer system 128 is similar to host computer system 102 and, for example, includes a central processing unit, an input output (I/O) interface, and a memory. Computer system 128 may further include standard devices such as a keyboard, a mouse, a printer, a display device and an I/O device(s). The various hardware components of computer system 128 are not illustrated to avoid detracting from the principles of the invention.

Network 126 can be any network or network system that is of interest to a user. In various embodiments, network interface 138 and I/O interface 110 include analog modems, digital modems, or a network interface card. The particular type, and configuration, of host computer system 102, computer system 128, and server computer system 130 are not essential to the present invention.

FIG. 2 illustrates a flow diagram of a method 200 for replacing a malicious driver at boot time in accordance with one embodiment of the invention. Referring now to FIGS. 1 and 2 together, in one embodiment, execution of malicious driver replacement application 106 by processor 108 results in the operations of method 200 as described below.

In the present embodiment, malicious driver replacement application 106 is installed on host computer system 102 and registered on host computer system 102 as a boot execute application. For example, in one embodiment, malicious driver replacement application 106 is installed on host computer system 102 and registered in the Windows registry at the key HKEY_LOCAL_MACHINE\SYSTEM\CurrentControlSet\Control\ Session Manager in the BootExecute value of host computer system 102 as a boot execute application, i.e., registered as a run application. In other embodiments, malicious driver replacement application 106 can be registered to run as host computer system 102 starts in other locations, such as in boot.ini, autoexec.bat, config.sys, or as a driver. In one embodiment, following installation and loading of malicious driver replacement application 106, method 200 is entered at an ENTER operation 202, and from ENTER operation 202, processing waits and, upon receipt of a malicious driver detection, transitions to a RECEIVE MALICIOUS DRIVER DETECTION operation 204.

In RECEIVE MALICIOUS DRIVER DETECTION operation 204, a malicious driver detection is received by malicious driver replacement application 106. In one embodiment, the malicious driver detection can be a malicious driver detection event sent from a security application, such as from security application 114, which detects malicious drivers present on host computer system 102.

In one embodiment, the malicious driver detection identifies a malicious driver on host computer system 102. In one embodiment, the malicious driver detection includes a file name of the malicious driver and a location of the malicious driver on host computer system 102.

In one embodiment, the location, herein also termed the malicious driver location, identifies the volume in which the malicious driver is located on host computer system 102. In some embodiments, the location includes the location of the malicious driver on the storage disk, e.g., the clusters of the malicious driver on the storage disk. From RECEIVE MALICIOUS DRIVER DETECTION operation 204, processing transitions to an ISSUE FIRST REBOOT SIGNAL operation 206.

In ISSUE FIRST REBOOT SIGNAL operation 206, malicious driver replacement application 106 issues a first reboot signal. In one embodiment, the first reboot signal is a soft reboot signal, such as a soft restart signal, or a soft restart API, which causes host computer system 102 to perform a soft reboot, i.e., a first reboot, of host computer system 102.

In some embodiments, prior to issuing the first reboot signal, malicious driver replacement application 106 writes and stores instructions, herein termed first instructions, to itself to be implemented on start up, i.e., on boot. For example, in one embodiment, the first instructions include instructions on locating and replacing the malicious driver identified in operation 204 with a dummy driver. In some embodiments, the first instructions further include instructions for taking protective actions, such as for remediating the malicious driver on host computer system 102. From ISSUE FIRST REBOOT SIGNAL operation 206, host computer system 102 is rebooted, during which malicious driver replacement application 106 is reloaded, and processing transitions to a RECEIVE FIRST START UP SIGNAL operation 208.

In RECEIVE FIRST START UP SIGNAL operation 208, on the first reboot of host computer system 102, malicious driver replacement application 106 receives a start up signal, herein termed a first start up signal, which starts execution of malicious driver replacement application 106. Thus, as malicious driver replacement application 106 was registered as a boot execute application, malicious driver replacement application 106 is loaded and executed on boot up of host computer system 102. From RECEIVE FIRST START UP SIGNAL operation 208, processing transitions to a LOCK VOLUME operation 210.

In LOCK VOLUME operation 210, malicious driver replacement application 106 locks the volume of the storage disk that includes the malicious driver identified in operation 204. This prevents other applications from writing to or reading from the volume of the storage disk in which the malicious driver is located.

In one embodiment, malicious driver replacement application 106 issues a lock volume command, or performs a set of instructions, that locks the volume in which the malicious driver is located. From LOCK VOLUME operation 210, processing transitions to a REPLACE MALICIOUS DRIVER ON DISK WITH DUMMY DRIVER operation 212.

In REPLACE MALICIOUS DRIVER ON DISK WITH DUMMY DRIVER operation 212, in one embodiment, the malicious driver is replaced on the physical storage disk with a dummy driver. More particularly, in one embodiment, malicious driver replacement application 106 determines the location of the malicious driver identified in operation 204 on the physical storage disk, e.g., in the volume on the physical storage disk. In one embodiment, malicious drier replacement application 106 directly overwrites the malicious driver, e.g., overwrites the code, on the storage disk with the dummy driver, e.g., with dummy driver code. In one embodiment, the dummy code of the dummy driver is innocuous code or null code.

As the malicious driver may be running and interfering with the operating system's normal operations, the Windows operating system cannot be trusted to replace the malicious driver utilizing standard Windows operating system operations. Thus, in the present embodiment, the Windows infrastructure is by-passed to the extent possible by directly replacing the malicious driver at the physical storage disk level, i.e., directly at the volume level, with the dummy driver.

In some embodiments, prior to replacing the malicious driver on the storage disk, the malicious driver is copied to a memory storage structure, such as a text file, for later evaluation, such as by a security evaluation service. An example of replacing a malicious driver on a storage disk with a dummy driver in accordance with one embodiment of the invention is further described herein with reference to FIGS. 3A and 3B.

Figure 3A:
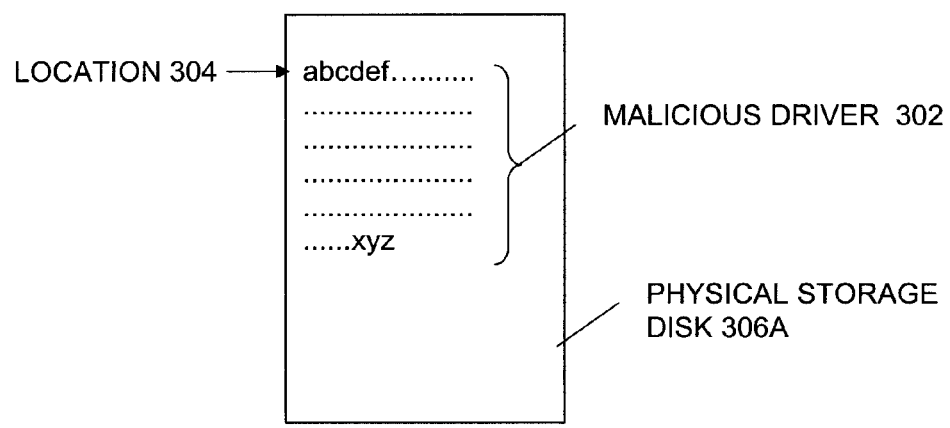
FIG. 3A is a diagram illustrating an example of a physical storage disk of the host computer system of FIG. 1 including a malicious driver.
Figure 3B:
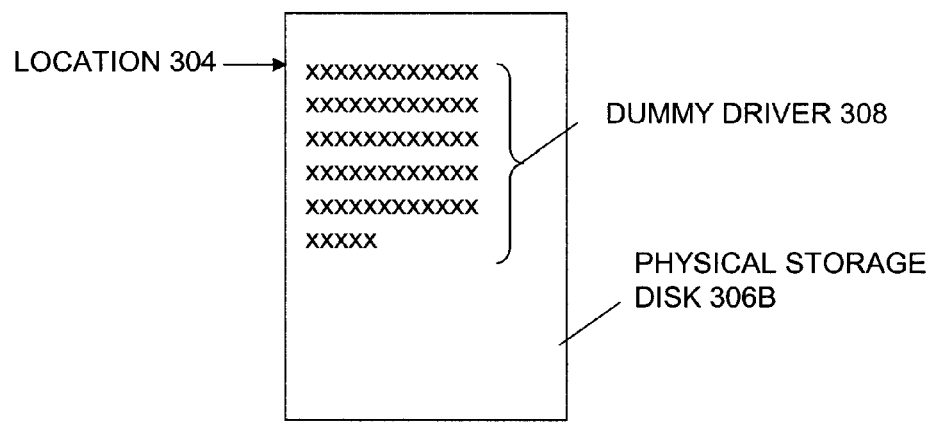
FIG. 3B is a diagram illustrating an example of the modified physical storage disk of FIG. 3A in which the malicious driver of FIG. 3A has been replaced with a dummy driver in accordance with one embodiment of the invention.

Referring now to FIGS. 3A and 3B, FIG. 3A is a diagram illustrating an example of a physical storage disk 306A of host computer system 102 including a malicious driver 302. In the present example, malicious driver 302 has been identified at location 304 on physical storage disk 306A, for example, in the malicious driver detection of operation 204.

FIG. 3B is a diagram illustrating an example of a physical storage disk 306B of host computer system 102 including a dummy driver 308 in accordance with one embodiment of the invention. In the present example, malicious driver 302 of FIG. 3A has been replaced at location 304 with dummy driver 308, for example, in operation 214. Referring now back again to FIG. 2, from REPLACE MALICIOUS DRIVER ON DISK WITH DUMMY DRIVER operation 212, processing transitions to an ISSUE SECOND REBOOT SIGNAL operation 214.

In ISSUE SECOND REBOOT SIGNAL operation 216, malicious driver replacement application 106 issues a second reboot signal. In one embodiment, the second reboot signal is a soft reboot signal, such as a soft restart signal, or a soft restart API, which causes host computer system 102 to perform a second soft reboot, i.e., a second reboot, of host computer system 102.

In some embodiments, prior to issuing the second reboot signal, malicious driver replacement application 106 writes and stores instructions, herein termed second instructions, to itself to be implemented on start up, i.e., on boot. For example, in one embodiment, the second instructions include instructions on start up.

For example, in one embodiment, the second instructions include instructions on locating the dummy driver on the storage disk and/or the stored malicious driver. In some embodiments, the second instructions further include instructions for remediating the malicious driver on host computer system 102, such as instructions for removing the malicious driver from host computer system 102. From ISSUE SECOND REBOOT SIGNAL operation 214, host computer system 102 is rebooted, during which malicious driver replacement application 106 is reloaded, and processing transitions to a RECEIVE SECOND START UP SIGNAL operation 216.

In RECEIVE SECOND START UP SIGNAL operation 216, on the second reboot of host computer system 102, malicious driver replacement application 106 receives a start up signal, herein termed a second start up signal, which starts execution of malicious driver replacement application 106. Thus again, as malicious driver replacement application 106 was registered as a boot execute application, malicious driver replacement application 106 is loaded and executed on boot up of host computer system 102.

On the second reboot, as the malicious driver was replaced with the dummy driver in operation 212, the dummy driver, i.e., the dummy driver code, is now loaded rather than the malicious driver, i.e., rather than the malicious driver code. Once host computer system 102 boots without the malicious driver running, the malicious driver can be remediated. From RECEIVE SECOND START UP SIGNAL operation 216, processing transitions to a TAKE PROTECTIVE ACTION(S) operation 218.

In TAKE PROTECTIVE ACTION(S) operation 218, protective action is taken. For example, in one embodiment, the malicious driver is deleted from host computer system 102. In some embodiments, the dummy driver is removed from the storage disk. In some embodiments, malicious driver replacement application 106 executes the second instructions.

In another embodiment, a remediation request is generated and sent to a security application, such as security application 114, which then takes protective action(s) to remediate the malicious driver on host computer system 102, such as by removing, disabling, or otherwise remediating the malicious driver. In some embodiments, the security application removes the dummy driver from the storage disk. From TAKE PROTECTIVE ACTION(S) operation 218, processing transitions to an EXIT operation 220, or optionally returns to operation 204 on receipt of a next malicious driver detection.

Referring again to FIG. 1, in one embodiment of the invention, malicious driver replacement application 106 is in memory 112. As used herein, a computer memory refers to a volatile memory, a non-volatile memory, or a combination of the two.

Although malicious driver replacement application 106 is referred to as an application, this is illustrative only. Malicious driver replacement application 106 should be capable of being called from an application or the operating system. In one embodiment, an application is generally defined to be any executable code. Moreover, those of skill in the art will understand that when it is said that an application or an operation takes some action, the action is the result of executing one or more instructions by a processor.

Embodiments in accordance with the present invention may be carried out using any suitable hardware configuration or means involving a personal computer, a workstation, a portable device, or a network of computer devices. Other network configurations other than client-server configurations, e.g., peer-to-peer, web-based, intranet, internet network configurations, are used in other embodiments.

Herein, a computer program product comprises a medium configured to store or transport computer readable code in accordance with an embodiment of the present invention. Some examples of computer program products are CD-ROM disks, DVDs, ROM cards, floppy disks, magnetic tapes, computer hard drives, servers on a network and signals transmitted over a network representing computer readable code. In another embodiment, a computer program product comprises a tangible storage medium configured to store computer readable code including CD-ROM disks, DVDs, ROM cards, floppy disks, magnetic tapes, computer hard drives, and servers on a network.

As illustrated in FIG. 1, this medium may belong to the computer system itself. However, the medium also may be removed from the computer system. For example, malicious driver replacement application 106 may be stored in memory 136 that is physically located in a location different from processor 108. Processor 108 should be coupled to the memory 136. This could be accomplished in a client-server system, or alternatively via a connection to another computer via modems and analog lines, or digital interfaces and a digital carrier line.

More specifically, in one embodiment, host computer system 102 and/or server computer system 130 is a portable computer, a workstation, a two-way pager, a cellular telephone, a digital wireless telephone, a personal digital assistant, a server computer, an Internet appliance, or any other device that includes components that can execute the functionality of malicious driver replacement application 106 in accordance with at least one of the embodiments as described herein. Similarly, in another embodiment, host computer system 102 and/or server computer system 130 is comprised of multiple different computers, wireless devices, cellular telephones, digital telephones, two-way pagers, or personal digital assistants, server computers, or any desired combination of these devices that are interconnected to perform, the methods as described herein.

In view of this disclosure, the functionality of malicious driver replacement application 106 in accordance with one embodiment of present invention can be implemented in a wide variety of computer system configurations. In addition, the functionality of malicious driver replacement application 106 could be stored as different modules in memories of different devices.

For example, malicious driver replacement application 106 could initially be stored in server computer system 130, and then as necessary, a portion of malicious driver replacement application 106 could be transferred to host computer system 102 and executed on host computer system 102. Consequently, part of the functionality of malicious driver replacement application 106 would be executed on processor 134 of server computer system 130, and another part would be executed on processor 108 of host computer system 102. In view of this disclosure, those of skill in the art can implement various embodiments of the present invention in a wide-variety of physical hardware configurations using an operating system and computer programming language of interest to the user.

In yet another embodiment, malicious driver replacement application 106 is stored in memory 136 of server computer system 130. Malicious driver replacement application 106 is transferred over network 126 to memory 112 in host computer system 102. In this embodiment, network interface 138 and I/O interface 110 would include analog modems, digital modems, or a network interface card. If modems are used, network 126 includes a communications network, and malicious driver replacement application 106 is downloaded via the communications network.

This disclosure provides exemplary embodiments of the present invention. The scope of the present invention is not limited by these exemplary embodiments. Numerous variations, whether explicitly provided for by the specification or implied by the specification or not, may be implemented by one of skill in the art in view of this disclosure.

What is claimed is:

1. A computer implemented method comprising:
receiving a malicious driver detection, said malicious driver detection identifying a location of a malicious driver on a host computer system;
issuing a first reboot signal, said first reboot signal causing said host computer system to perform a first reboot;
receiving a first start up signal;
locking a volume of a storage disk on which said malicious driver is located;
replacing said malicious driver on said storage disk with a dummy driver;
issuing a second reboot signal, said second reboot signal causing said host computer system to perform a second reboot;
receiving a second start up signal; and
taking protective action(s).

2. The computer implemented method of claim 1 wherein said computer implemented method is installed on said host computer system and registered as a boot execute application.

3. The computer implemented method of claim 1 wherein taking protection action(s) comprises:
issuing a remediation signal, said remediation signal signaling a separate process to remediate said malicious driver on said host computer system.

4. The computer implemented method of claim 1 wherein said taking protective action(s) comprises:
removing said malicious driver from said host computer system.

5. The computer implemented method of claim 1 further comprising:
writing first instructions for execution subsequent to said receiving a first start up signal; and
storing said first instructions.

6. The computer implemented method of claim 5 further comprising:
executing said first instructions subsequent to said receiving a first start up signal.

7. The computer implemented method of claim 1 further comprising:
writing second instructions for execution subsequent to said receiving a second start up signal; and
storing said second instructions.

8. The computer implemented method of claim 7 further comprising:
executing said second instructions subsequent to said receiving a second start up signal.

9. A computer system comprising:
a memory having stored therein a malicious driver replacement application for replacing a malicious driver; and
a processor coupled to said memory, wherein execution of said malicious driver replacement application generates a method comprising:
receiving a malicious driver detection, said malicious driver detection identifying a location of a malicious driver on a host computer system;
issuing a first reboot signal, said first reboot signal causing said host computer system to perform a first reboot;
receiving a first start up signal;
locking a volume of a storage disk on which said malicious driver is located;
replacing said malicious driver on said storage disk with a dummy driver;
issuing a second reboot signal, said second reboot signal causing said host computer system to perform a second reboot;
receiving a second start up signal; and
taking protective action(s).

10. The computer system of claim 9 wherein said malicious code replacement application is installed on said host computer system and registered as a boot execute application.

11. The computer system of claim 9 wherein taking protection action(s) comprises:
issuing a remediation signal, said remediation signal signaling a separate process to remediate said malicious driver on said host computer system.

12. The computer system of claim 9 wherein said taking protective action(s) comprises:
removing said malicious driver from said host computer system.

13. The computer system of claim 9 further comprising:
writing first instructions for execution subsequent to said receiving a first start up signal; and
storing said first instructions.

14. The computer system of claim 9 further comprising:
writing second instructions for execution subsequent to said receiving a second start up signal; and
storing said second instructions.

15. A nontransitory tangible computer readable storage medium containing computer program code comprising:
a malicious driver replacement application for replacing a malicious driver, said malicious driver replacement application comprising:
means for receiving a malicious driver detection, said malicious driver detection identifying a location of a malicious driver on a host computer system;
means for issuing a first reboot signal, said first reboot signal causing said host computer system to perform a first reboot;
means for receiving a first start up signal;
means for locking a volume of a storage disk on which said malicious driver is located;
means for replacing said malicious driver on said storage disk with a dummy driver;
means for issuing a second reboot signal, said second reboot signal causing said host computer system to perform a second reboot;
means for receiving a second start up signal; and
means for taking protective action (s).

16. The computer program product of claim 15 wherein said malicious driver replacement application is installed on said host computer system and registered as a boot execute application.

17. The computer program product of claim 15 wherein taking protection action(s) comprises:
    means for issuing a remediation signal, said remediation signal signaling a separate process to remediate said malicious driver on said host computer system.

18. The computer program product of claim 15 wherein said taking protective action(s) comprises:
    means for removing said malicious driver from said host computer system.

19. The computer program product of claim 15 further comprising:
    means for writing first instructions for execution subsequent to said receiving a first start up signal; and
    means for storing said first instructions.

20. The computer program product of claim 15 further comprising:
    means for writing second instructions for execution subsequent to said receiving a second start up signal; and
    means for storing said second instructions.

* * * * *